(12) United States Patent
Vey et al.

(10) Patent No.: US 11,661,043 B2
(45) Date of Patent: May 30, 2023

(54) METHOD FOR ASCERTAINING AN OPERATING VARIABLE OF A DRUM BRAKE, DRUM BRAKE ASSEMBLY, ANALYSIS UNIT, AND STORAGE MEDIUM

(71) Applicant: Continental Teves AG & Co. OHG, Frankfurt (DE)

(72) Inventors: Christian Vey, Frankfurt (DE); Hermann Winner, Bietigheim (DE); Jens Hoffmann, Darmstadt (DE); Martin Kruse, Frankfurt (DE); Christian Philipp, Neu-Isenburg (DE); Uwe Bach, Niedernhausen (DE); Holger von Hayn, Bad Vilbel (DE); Jürgen Böhm, Oberneisen (DE); Christof Maron, Usingen (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 379 days.

(21) Appl. No.: 16/792,713

(22) Filed: Feb. 17, 2020

(65) Prior Publication Data

US 2020/0180575 A1 Jun. 11, 2020

Related U.S. Application Data

(63) Continuation of application No. PCT/EP2018/074374, filed on Sep. 11, 2018.

(30) Foreign Application Priority Data

Sep. 29, 2017 (DE) .................... 10 2017 217 413.7

(51) Int. Cl.
*B60T 8/171* (2006.01)
*B60T 1/06* (2006.01)

(52) U.S. Cl.
CPC .............. *B60T 8/171* (2013.01); *B60T 1/067* (2013.01); *B60T 2270/206* (2013.01)

(58) Field of Classification Search
CPC ..... B60T 8/171; B60T 1/067; B60T 2270/206
See application file for complete search history.

(56) References Cited

U.S. PATENT DOCUMENTS 4,615,419 A    10/1986   Gaiser
5,236,251 A *   8/1993   Harries ................... B60T 11/34
                                                                 303/9.69

(Continued)

FOREIGN PATENT DOCUMENTS

CN        101861260 A    10/2010
DE         4024811 A1    2/1992

(Continued)

OTHER PUBLICATIONS

International Search Report and Written Opinion dated Nov. 16, 2018 from corresponding International Patent Application No. PCT/EP2018/074374.

(Continued)

*Primary Examiner* — Thomas Ingram

(57) ABSTRACT

A method for ascertaining an operating variable of a drum brake, the method using forces acting on supporting bearings. The invention further relates to an associated drum brake assembly, an associated analysis unit and an associated storage medium.

10 Claims, 2 Drawing Sheets

(56) References Cited

U.S. PATENT DOCUMENTS

| | | | |
|---|---|---|---|
| 6,216,832 B1* | 4/2001 | Doell | F16D 51/00 |
| | | | 188/341 |
| 10,071,715 B2* | 9/2018 | Mathieu | F16D 66/00 |
| 2002/0084693 A1* | 7/2002 | Isono | B60T 8/4018 |
| | | | 303/113.1 |
| 2003/0145651 A1* | 8/2003 | Hofmann | B60T 13/662 |
| | | | 73/146 |
| 2010/0206677 A1 | 8/2010 | Shiraki | |
| 2012/0073922 A1* | 3/2012 | Kaestner | B60W 30/18127 |
| | | | 303/3 |
| 2013/0231838 A1* | 9/2013 | Shiozawa | G01M 17/007 |
| | | | 701/32.9 |
| 2018/0154879 A1 | 6/2018 | Schneider et al. | |

FOREIGN PATENT DOCUMENTS

| | | | | |
|---|---|---|---|---|
| DE | 102005021719 A1 * | 11/2006 | | B60T 7/122 |
| DE | 102005021719 A1 | 11/2006 | | |
| DE | 102016203476 A1 | 9/2017 | | |
| EP | 0221299 A2 | 5/1987 | | |
| EP | 0523338 A2 | 1/1993 | | |
| EP | 1095834 A2 | 5/2001 | | |
| EP | 0988468 B1 | 8/2004 | | |
| JP | S62160949 A | 7/1987 | | |
| JP | H08327478 A | 12/1996 | | |
| JP | H061698 A | 3/1998 | | |
| JP | 2001191903 A | 7/2001 | | |
| JP | 2010274689 A | 12/2010 | | |
| WO | 99/37935 A1 | 7/1999 | | |
| WO | 2006/119837 A1 | 11/2006 | | |
| WO | 2017/021114 A1 | 2/2017 | | |

OTHER PUBLICATIONS

Japanese Notice of Reasons for Refusal drafted Jan. 25, 2021 for the counterpart Japanese Patent Application No. 2020-513833.

Office Action dated Nov. 2, 2021 from corresponding Japanese patent application No. JP 2020-513833.

Office Action dated Nov. 23, 2021 from corresponding Korean patent application No. KR 10-2020-7006212.

European Examination Report dated Feb. 21, 2023 for the counterpart European Patent Application No. 18773358.9.

* cited by examiner

METHOD FOR ASCERTAINING AN OPERATING VARIABLE OF A DRUM BRAKE, DRUM BRAKE ASSEMBLY, ANALYSIS UNIT, AND STORAGE MEDIUM

CROSS REFERENCE TO RELATED APPLICATIONS

This application is the U.S. National Phase application of PCT International Application No. PCT/EP2018/074374, filed Sep. 11, 2018, which claims priority to German Patent Application No. DE 10 2017 217 413.7, filed Sep. 29, 2017, wherein the contents of such applications are incorporated herein by reference.

TECHNICAL FIELD

A method for ascertaining an operating variable of a drum brake, an associated drum brake assembly, an associated analysis unit and an associated storage medium.

TECHNICAL BACKGROUND

Drum brakes are often used as service brakes in motor vehicles. They can also perform a parking brake function. In the case of known drum brakes, they are typically actuated hydraulically by a brake cylinder, which, in turn, is actuated directly by a brake pedal. Thus, a driver of the motor vehicle can achieve a braking effect by pressing the brake pedal.

Drum brakes can also be of electromechanical construction, enabling them to act independently of a hydraulic brake system. This may be appropriate, for example, for a braking function which is triggered directly by vehicle electronics.

Examples of drum brakes are shown in WO 99/37935 A1, EP 988468 B1, U.S. Pat. No. 4,615,419 and WO 2017/021114 A1.

Known drum brakes are typically not monitored to determine whether they are achieving the desired braking effect, i.e. whether a desired braking torque or a desired application force is being produced.

BRIEF DESCRIPTION OF THE DRAWINGS

Further features and advantages will be gathered by a person skilled in the art from the exemplary embodiment described below with reference to the appended drawings. In the drawings.

Figure 1:
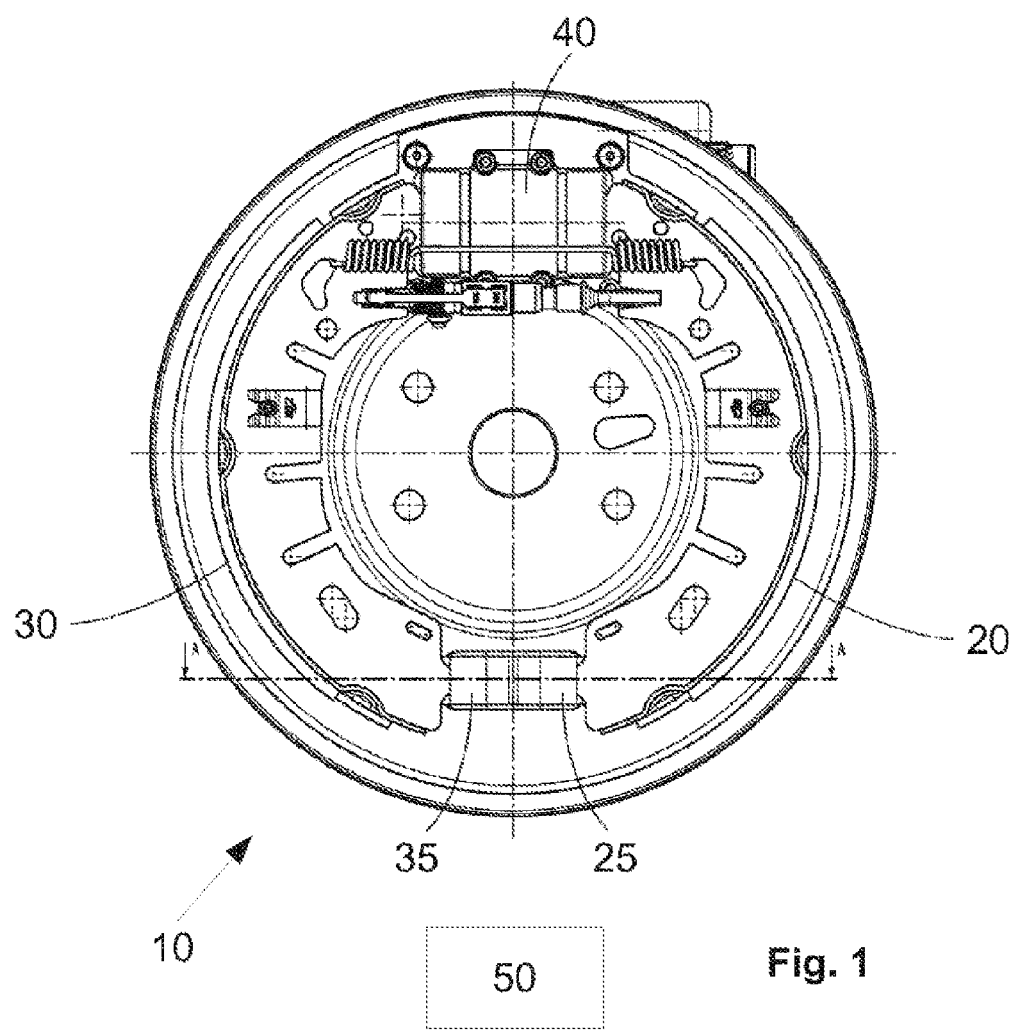
FIG. 1: shows an electromechanical drum brake.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

It is therefore an object to provide a method for ascertaining an operating variable of a drum brake which allows better monitoring of a drum brake. It is furthermore an object of the invention to provide an associated drum brake assembly by means of which a method of this kind can be executed. Moreover, objects of the invention are to provide an associated analysis unit and an associated storage medium.

According to the invention, this is achieved by means of a method, a drum brake assembly, an analysis unit and a non-volatile computer-readable storage medium according to the respective main claims. Advantageous refinements can be gathered, for example, from the respective dependent claims. The content of the claims is incorporated in the content of the description by express reference.

The method for ascertaining an operating variable of a drum brake, the method having the following steps:

recording at least one bearing force of a brake shoe of the drum brake by means of a sensor, and calculating the operating variable based on the bearing force.

As the inventor of the present application has ascertained, typical operating variables that can advantageously be monitored during the operation of a drum brake can be calculated based on such a bearing force.

According to one embodiment, the operating variable is a braking torque while the drum of the drum brake is rotating. It is thereby possible to monitor an effect of the drum brake as a service brake for decelerating a moving vehicle.

According to one embodiment, the bearing force is measured at a leading brake shoe of the drum brake, wherein the braking torque is calculated by multiplying the bearing force by a predetermined factor. It is thereby possible to achieve an estimation of the braking torque which is sufficient in practice for numerous applications.

According to one embodiment, the bearing force is measured at a leading brake shoe of the drum brake, wherein a further bearing force is measured at a trailing brake shoe of the drum brake. In this case, the braking torque is calculated based on the bearing force and the further bearing force.

It is thereby possible to perform a calculation of the braking torque which is even better than with the use of just one bearing force and which comes closest to the actually exerted braking torque in even more operating situations.

Here, a leading brake shoe is typically interpreted to mean a brake shoe which is pressed into the bearing by a rotating drum of the drum brake. Here, a trailing brake shoe is typically interpreted to mean a brake shoe which is pushed out of the bearing by the rotating drum of the drum brake.

In this context, the braking torque is calculated as a difference between the bearing force and the further bearing force, wherein the difference is multiplied by a predetermined factor. This has proven to be a simple and accurate calculation procedure for the braking torque in typical applications.

According to one embodiment, the operating parameter is an application force while the drum of the drum brake is not rotating. It is thereby possible to monitor an application force when the drum brake is being used as a parking brake. In this case, therefore, the drum brake is holding a stationary vehicle at rest.

In this case, it is possible, in particular, for the application force to be calculated by multiplying the bearing force by a predetermined factor. This has proven to be a simple and accurate calculation procedure for typical applications.

It should be understood that the embodiments described herein relating to the calculation of an application force and the calculation of a braking torque can also be combined with one another, and therefore, for example, the operating variable can be a braking torque when the vehicle is in motion and the drum of the drum brake is rotating, and the operating parameter is an application force when the vehicle is not in motion and the drum of the drum brake is not rotating.

It is possible, in particular, to use an electromechanical drum brake as a drum brake. In the case of electromechanical drum brakes of this kind, monitoring as described herein may be particularly advantageous since it allows further automation processes, such as autonomous driving or automatic braking.

The bearing force is measured at a supporting bearing of the brake shoe. The further bearing force is likewise measured at a further supporting bearing of the further brake shoe. As a result, the bearing force and the further bearing force can be measured directly at respective supporting bearings, wherein the brake shoes can be supported in the supporting bearings on further parts of the drum brake.

The invention further relates to a drum brake assembly. The drum brake assembly has at least one brake shoe, at least one supporting bearing and at least one force sensor on the supporting bearing for measuring a bearing force produced at the supporting bearing by the brake shoe. The drum brake assembly furthermore has an analysis unit, which is configured to execute a method according to the invention. In respect of the method according to the invention, reference can be made to all of the embodiments and variants described herein.

According to one embodiment, the drum brake assembly has at least one further brake shoe, at least one further supporting bearing and at least one further force sensor on the further supporting bearing for measuring a further bearing force produced in the further supporting bearing by the further brake shoe. In this case, the analysis unit is configured to execute a method using a further bearing force as described herein. In respect of this method, reference can be made to all of the described embodiments and variants.

The invention further relates to an analysis unit, which is configured to execute a method according to the invention. Moreover, the invention relates to a non-volatile, computer-readable storage medium which contains program code, during the execution of which a processor executes a method according to the invention. In respect of the method according to the invention, reference can in each case be made here to all of the embodiments and variants described herein.

An operating parameter produced, e.g. an application force or a braking torque, can be used to control the drum brake, for example.

FIG. 1 shows a drum brake assembly 10 having an electromechanical drum brake in a schematic illustration, although the drum is not illustrated.

The drum brake assembly 10 illustrated in FIG. 1 has a first brake shoe 20 and a second brake shoe 30. The drum (not illustrated) of a drum brake typically surrounds the brake shoes 20, 30. The first brake shoe 20 is supported in a first supporting bearing 25. This contains a first force sensor, which is not illustrated separately. The second brake shoe 30 is supported in a second supporting bearing 35. This contains a second force sensor, which is not illustrated separately.

A spreading unit 40 is arranged between the two brake shoes 20, 30 on the upper side of the drum brake. In the present case, this is an electromechanical spreading unit 40. This can push the two brake shoes 20, 30 apart, causing them to make contact with a surrounding drum and to brake the drum if it is rotating. If the drum is not rotating, the brake shoes can exert a holding force. Thus, the drum brake 10 can be used both as a service brake and as a parking brake.

When the spreading unit 40 presses the two brake shoes 20, 30 against the inside of the drum, they are supported by reaction forces at the supporting bearings 25, 35. There, the forces which arise as a result are measured.

The drum brake assembly 10 has an analysis unit 50 according to one exemplary embodiment of the invention. This is configured for executing a method according to one exemplary embodiment of the invention. During this process, the measured forces which have just been mentioned are processed further.

A description is given below with reference to FIGS. 2 to 4 as to how the measured forces can be analyzed.

Figure 2:
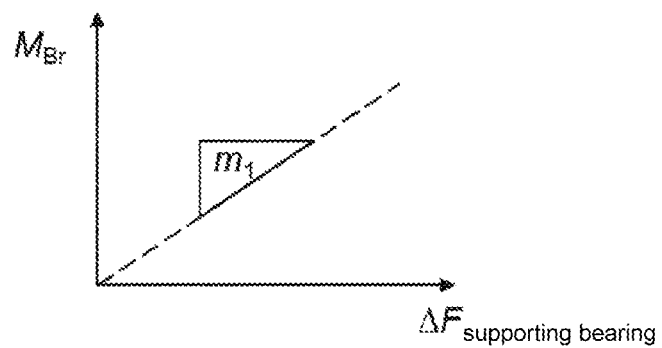
FIG. 2: shows a relationship between the braking torque and the force difference.

FIG. 2 shows a variant in which a braking torque is calculated based on a force difference. It has been found here that formation of the difference between the bearing forces of the leading and the trailing brake shoe 20, 30 is a suitable criterion. In the case of a drum which is rotating clockwise, for example, (in the illustration in FIG. 1), the first brake shoe 20 can be a leading brake shoe and the second brake shoe 30 can be a trailing brake shoe. Here, the relationship between the braking torque and the force difference between a force $F_{auf}$ of the leading brake shoe and a force $F_{abl}$ of the trailing brake shoe is proportional to a proportionality factor $m_1$. The braking torque $M_{Br}$ as the operating variable is thus calculated according to the following formula:

$$M_{Br}=(F_{auf}-F_{abl}) \cdot m_1 = \Delta f_{supporting\ bearing} \cdot m_1$$

Here, the force difference has been designated as $\Delta F_{supporting\ bearing}$.

The braking torque and the bearing forces are dependent on variable boundary conditions, e.g. temperature, rotational speed or friction coefficient of the brake. With the same actuating force, for example, the braking torque and the forces at the supporting bearing are reduced as the temperature rises. At the same time, however, the relationship between the braking torque and the force difference remains virtually constant. Thus, the criterion for determining the braking torque is independent of the variable boundary conditions and provides a high accuracy for various operating ranges.

Figure 3:
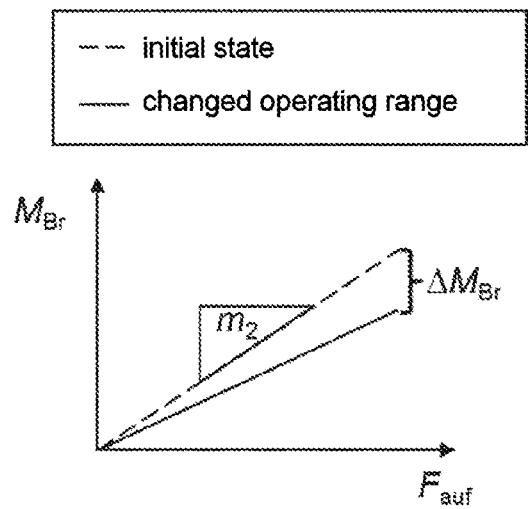
FIG. 3: shows a relationship between the braking torque and a force at a supporting bearing.

A further, more simple possibility for determining a braking torque is illustrated in FIG. 3. This too takes place in the operational case of a rotating drum. In this case, however, only the supporting force $F_{auf}$ of a leading brake shoe is used. This shoe is actuated significantly more powerfully than the trailing brake shoe. The relationship is established by means of a proportionality factor $m_2$:

$$M_{Br}=F_{auf} \cdot m_2$$

In contrast to the formation of the difference between the forces, this variant exhibits dependence on the variable boundary conditions. A deviation $\Delta M_{Br}$ with respect to the constant proportionality factor $m_2$ therefore arises. Thus, this relationship has a lower accuracy over the various operating ranges in comparison with variant 1 but, on the other hand, is easier to calculate. The deviation to be expected is illustrated schematically in FIG. 3, namely in the form of separate characteristics for the initial state, which is calculated by means of the proportionality factor $m_2$, and the changed operating range.

Figure 4:
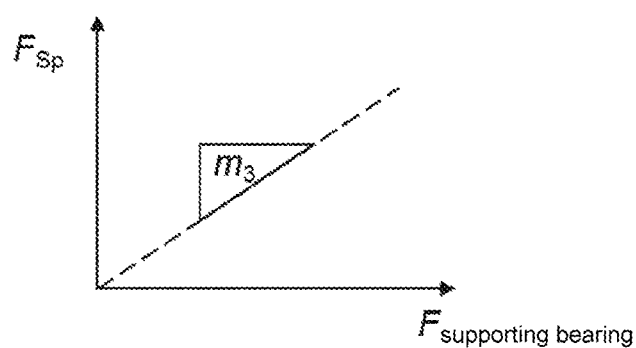
FIG. 4: shows a relationship between an application force and a force at a supporting bearing.

FIG. 4 shows an embodiment for ascertaining an application force in the case of a stationary drum under no torque. This is the case, for example, when parking on a level surface. In this case, there is a proportional relationship between a force $F_{supporting\ bearing}$ at the supporting bearing and the application force $F_{Sp}$. The forces at the supporting bearings 25, 35 of the two brake shoes 20, 30 are identical in this operational case. The relationship between the application force $M_{Sp}$ and the forces at the supporting bearings 25, 35 is described by means of the proportionality factor $m_3$:

$$F_{Sp} = F_{supporting\ bearing} \cdot m_3$$

This relationship is illustrated in FIG. 4.

By means of the procedure according to the invention, it is possible to implement a braking-torque-based control concept for a service brake. It is possible to avoid a sideways pull due to braking torque differences. It is also possible to implement an application-force-based control concept for a parking brake.

The procedures described here can be used, in particular, for a simplex brake, e.g. by force measurement at the supporting bearing.

The mentioned steps of the method according to the invention can be executed in the indicated order. However, they can also be executed in a different order. In one of its embodiments, for example with a specific combination of steps, the method according to the invention can be executed in such a way that no further steps are executed. However, in principle, further steps can also be executed, even steps of a kind which have not been mentioned.

The claims that are part of the application do not represent any renouncement of the attainment of further protection.

If it turns out in the course of proceedings that a feature or a group of features is not absolutely necessary, then the applicant aspires right now to a wording for at least one independent claim that no longer has the feature or the group of features. This may be, by way of example, a subcombination of a claim available on the filing date or may be a subcombination of a claim available on the filing date that is limited by further features. Claims or combinations of features of this kind requiring rewording are intended to be understood to be covered by the disclosure of this application as well.

It should further be pointed out that configurations, features and variants of the invention that are described in the various embodiments or exemplary embodiments and/or shown in the figures are combinable with one another in any way. Single or multiple features can be interchanged with one another in any way. Combinations of features arising therefrom are intended to be understood to be covered by the disclosure of this application as well.

Back-references in dependent claims are not intended to be understood as dispensing with the attainment of independent substantive protection for the features of the back-referenced subclaims. These features can also be combined with other features in any way.

Features that are disclosed only in the description or features that are disclosed in the description or in a claim only in conjunction with other features may fundamentally be of independent significance to the invention. They can therefore also be individually included in claims for the purpose of distinction from the prior art.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

The invention claimed is:

1. A method for ascertaining an operating variable of a drum brake, the method comprising:
   measuring a first bearing force on a leading brake shoe of the drum brake with a first sensor;
   measuring a further bearing force on a trailing brake shoe of the drum brake with a second sensor;
   recording the first bearing force and the second bearing force;
   calculating an operating variable, wherein the operating variable is a brake torque based on a difference between the first bearing force and the further bearing force multiplied by a predetermined factor; and
   applying the calculated braking torque to the drum brake.

2. The method as claimed in claim 1, wherein the operating variable is a braking torque while the drum of the drum brake is rotating.

3. The method as claimed in claim 1, wherein the operating parameter is an application force while the drum of the drum brake is not rotating.

4. The method as claimed in claim 3, wherein the application force is calculated by multiplying the bearing force by a predetermined factor ($m_3$).

5. The method as claimed in claim 1, wherein an electromechanical drum brake is used as the drum brake.

6. The method as claimed in claim 1, wherein the bearing force is measured at at least one of a supporting bearing of the brake shoe, and a further supporting bearing of the further brake shoe.

7. The method as claimed in claim 1, wherein the drum brake is one of a service brake and a parking brake.

8. The method as claimed in claim 1, wherein the drum brake having an electromechanical expansion unit is used.

9. A drum brake assembly comprising:
   a leading brake shoe;
   at least one supporting bearing for the leading brake shoe;
   a trailing brake shoe;
   at least one further supporting bearing for the trailing brake shoe;
      at least one force sensor on the supporting bearing for measuring a bearing force produced in the supporting bearing by the leading brake shoe; at least one further force sensor on the further supporting bearing for measuring a bearing force produced in the further supporting bearing by the trailing brake shoe; and
      an analysis unit, having instructions for calculating an operating variable, wherein the operating variable is a brake torque based on a difference between the first bearing force and the further bearing force multiplied by a predetermined factor.

10. The drum brake assembly as claimed in claim 9, wherein the operating variable is a braking torque while the drum of the drum brake is rotating.

\* \* \* \* \*